US008033249B1

(12) United States Patent
Cook et al.

(10) Patent No.: US 8,033,249 B1
(45) Date of Patent: Oct. 11, 2011

(54) PET LITTER MAT

(75) Inventors: Karen Q. Cook, Shady Dale, GA (US); James Michael Lay, Cary, NC (US)

(73) Assignee: Purr-fect Pet Co. LLC, Shady Dale, GA (US)

( * ) Notice: Subject to any disclaimer, the term of this patent is extended or adjusted under 35 U.S.C. 154(b) by 520 days.

(21) Appl. No.: 12/215,019

(22) Filed: Jun. 23, 2008

Related U.S. Application Data

(60) Provisional application No. 60/958,495, filed on Jul. 6, 2007.

(51) Int. Cl.
*A01K 1/015* (2006.01)

(52) U.S. Cl. ........................................................ 119/165

(58) Field of Classification Search .................. 119/165, 119/458, 471, 479, 28.5, 526, 527, 169; 15/215
See application file for complete search history.

(56) References Cited

U.S. PATENT DOCUMENTS

| | | | | |
|---|---|---|---|---|
| 82,647 A * | 9/1868 | Shepard | ........................... | 15/215 |
| 1,215,235 A * | 2/1917 | Atwood | ........................... | 52/675 |
| 2,421,171 A * | 5/1947 | Trautvetter et al. | ............ | 52/180 |
| 2,667,654 A * | 2/1954 | Goessele et al. | ................ | 15/215 |
| 2,733,684 A * | 2/1956 | Trenchard | ..................... | 119/526 |
| 3,699,926 A * | 10/1972 | Stockl | ............................ | 119/526 |
| 3,771,495 A * | 11/1973 | Stevenson et al. | ............ | 119/480 |
| 4,211,185 A * | 7/1980 | Karlsson | ........................ | 119/526 |
| 5,220,886 A * | 6/1993 | Hyde | ............................. | 119/165 |
| D343,260 S * | 1/1994 | Kovatch | ........................ | D30/120 |
| D351,694 S * | 10/1994 | Evans | ............................ | D30/161 |
| 5,364,687 A * | 11/1994 | Kil et al. | ........................ | 428/184 |
| D383,253 S * | 9/1997 | Semenuk | ...................... | D30/120 |
| 5,797,352 A * | 8/1998 | Ebert | ............................. | 119/652 |
| 5,816,195 A * | 10/1998 | Flynn | ............................ | 119/165 |
| 5,924,383 A * | 7/1999 | Smith | ........................... | 119/165 |
| 6,050,223 A * | 4/2000 | Harris | ........................... | 119/165 |
| 6,109,212 A * | 8/2000 | Schacherbauer | ............ | 119/165 |
| 6,220,205 B1 * | 4/2001 | Massie | ......................... | 119/28.5 |
| 6,296,919 B1 * | 10/2001 | Rockwell et al. | ............... | 428/85 |
| 6,298,808 B1 * | 10/2001 | Crafton et al. | ................. | 119/165 |
| 6,357,388 B1 * | 3/2002 | Holtrop et al. | ............... | 119/28.5 |
| D456,533 S * | 4/2002 | Moller, Jr. | ..................... | D25/163 |
| 6,371,048 B1 * | 4/2002 | Smith | ............................ | 119/166 |
| 6,505,444 B1 * | 1/2003 | Johnson | .......................... | 52/177 |
| 6,537,642 B1 * | 3/2003 | Jacquet | ........................... | 428/99 |
| 6,589,631 B1 * | 7/2003 | Suzuki et al. | .................. | 428/172 |
| 6,684,816 B2 * | 2/2004 | Lippincott | ..................... | 119/171 |
| 6,802,281 B2 * | 10/2004 | Otsuji et al. | .................. | 119/169 |
| D517,753 S * | 3/2006 | Northrop | ...................... | D30/161 |
| D518,248 S * | 3/2006 | Northrop | ...................... | D30/161 |
| D523,192 S * | 6/2006 | Northrop | ...................... | D30/161 |
| 7,060,141 B2 * | 6/2006 | Mathew | ........................... | 156/72 |
| 7,111,585 B2 * | 9/2006 | Hale et al. | ..................... | 119/652 |
| D553,305 S * | 10/2007 | Willinger et al. | ............ | D30/133 |
| 7,392,765 B2 * | 7/2008 | Lingmann | ..................... | 119/526 |
| 7,621,233 B2 * | 11/2009 | Dukes et al. | ................... | 119/165 |
| D609,411 S * | 2/2010 | Crout et al. | ................... | D30/161 |

(Continued)

*Primary Examiner* — Yvonne R. Abbott
(74) *Attorney, Agent, or Firm* — Kenneth E. Darnell

(57) ABSTRACT

A mat intended to be placed in proximity to a litter box so that a pet exiting the litter box will walk over the mat with the result that particles of litter temporarily adhering to the feet of the pet will be dislodged through interaction with the structure of the mat, the dislodged litter particles being collectible in medially disposed channels formed in the mat which facilitate pouring of the particles back into the litter box. The litter mat is structurally configured and formed of a material that facilitates cleaning of the mat.

14 Claims, 5 Drawing Sheets

U.S. PATENT DOCUMENTS

| | | | |
|---|---|---|---|
| 7,654,227 B1 * | 2/2010 | Yananton | 119/169 |
| 7,673,585 B1 * | 3/2010 | Emmi et al. | 119/168 |
| D613,464 S * | 4/2010 | Cook et al. | D30/161 |
| 2005/0263089 A1 * | 12/2005 | Hirokawa et al. | 119/165 |
| 2008/0105208 A1 * | 5/2008 | Hamrick | 119/165 |

* cited by examiner

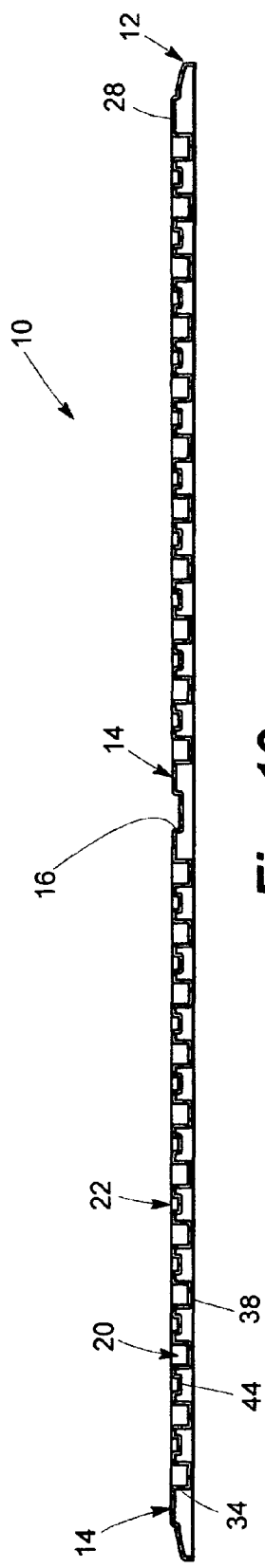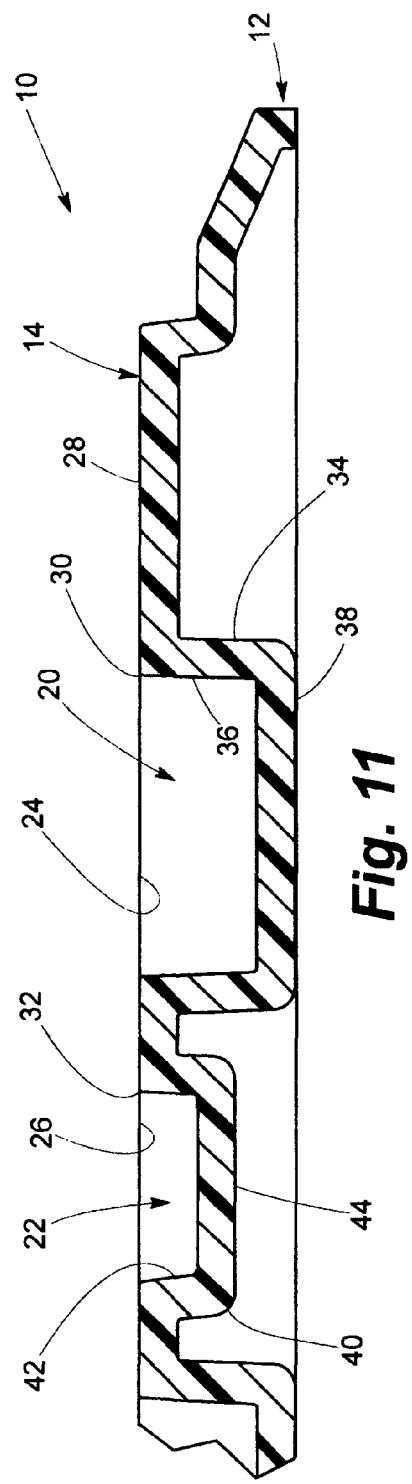

PET LITTER MAT

CROSS-REFERENCE TO RELATED APPLICATION

This application claims priority to U.S. Provisional Patent Application Ser. No. 60/958,495, filed Jul. 6, 2007.

BACKGROUND OF THE INVENTION

1. Field of the Invention

The invention relates to mat structures useful not only as flooring for animal caging but also as surfaces locatable in the vicinity of a pet litter box and on which a pet exiting the box will walk over the mat structure to dislodge litter particles from the pet's paws, the dislodged litter particles being collectible on the mat structure for return to the litter box. The mat structures of the invention also find utility in other use environments for facilitating dislodgement of debris from the feet of users walking over or contacting surfaces of the mat structures.

2. Description of the Prior Art

Pets commonly trained to use litter boxes include cats, ferrets, rabbits, guinea pigs, hamsters and the like, litter boxes usually containing absorbent, fine granular particles typically formed of clay or other mineral matter, organic materials such as leaf mulch, wheat by-products and other cellulosic materials and synthetic materials formed into fine granules. Unavoidably, these fine-grained particles tend to adhere to or become lodged within various portions of a pet's paws such as between the digits, on the pads of the paws or on or in fur or hair surrounding the paws. On exiting a litter box after use, the pet invariably carries litter particles various distances from the litter box with the result that the particles dislodge in environmental spaces remote from the litter box and particularly on and in rugs and the like in living areas, thereby creating unpleasant and potentially unhealthy conditions.

Solutions to this problem have previously been addressed such as by placement of mats in proximity to a litter box in an egress path, these mats being variously formed of materials such as "artificial turf", rug-like swatches formed of fibrous materials used either with or without rubber-like coatings or of natural or synthetic elastomeric materials having tread surfaces variously formed such as with elongated raised elements such as fibrous "tufts". As one example, Link et al, in U.S. Pat. No. 6,386,143, disclose a litter mat intended for disposition next to a litter box and having upper surfaces formed of spaced, triangular-in-section ridges, the apices of which contact a pet's paws to facilitate dislodgement of litter particles onto the mat rather than on flooring surfaces remote from the litter box. According to Link et al, litter particles dislodged from a pet's paws and held between the ridges can be recycled. Ebert, in U.S. Pat. No. 5,797,352, discloses a litter mat intended for disposition next to a litter box, the litter mat having a tread surface formed of angled and parallel ridges intended to facilitate removal of litter particles from a pet's paws by deformation of the ridges, litter particles being held in elongated channels between the ridges for return to the litter box or for other recycle. Marr, in U.S. Pat. No. 3,726,255, and Semenuk, in U.S. Pat. No. Des. 383,253, disclose flooring for animal caging having openings formed in resilient matting capable of trapping granular and other waste particles.

The prior art has failed to provide a litter mat or flooring for animal caging that is suitably amenable to a pet's need to walk on a relatively familiar, comfortable surface and which is configured to passively dislodge litter particles and the like from the pet's paws through not only contact between the paws and structure formed on tread surfaces but also due to flexure of the mat caused by the weight of the pet, the structure of the present mat being so configured for such functions while providing a familiar surface on which the pet chooses to walk on rather than jump over. Litter particles dislodged from the pet by the cooperative interaction of the present mat and the pet are trapped by the mat structure in preferred embodiments and are collectible centrally of the mat for ease of return of the particles to a litter box. The present litter mat is further configured from particular materials that facilitate cleaning by a simple water spray or by dislodgment of dried waste by flexure of the mat. The present litter mat therefore finds solutions to long-felt needs in the art.

SUMMARY OF THE INVENTION

While the invention provides mat structures useable in a variety of situations including as car mats, door mats and the like, the invention particularly provides pet litter mats and also similar flooring usable in association with animal caging and will be primarily so described herein, the structures of the invention being configured to interact with a pet walking over upper or tread-like surfaces thereof to actively dislodge litter particles and the like from the pet, such as from the feet of the pet, the dislodged litter particles being receivable in preferred embodiments within a multiplicity of cavities formed in upper surfaces of the structure for retention of said particles until intended removal from the mat structures such as for recycling back into the litter box. The litter mats of the invention particularly provide surfaces over which a pet walks after exiting from a litter box, which surfaces are configured to be comfortable and familiar to the pet so that the pet will not avoid walking on the mats. Cavities of varying sizes are preferably formed in the upper surfaces of the mats, edges of the cavities facilitating dislodgment of litter particles from paws of the pet, litter particles falling into the cavities and thus being unavailable for adherence to the paws of a pet on subsequent contact between the pet and a mat. The litter particles are further retained in the cavities for subsequent collection within preferably intersecting channels formed centrally of a mat by grasping of the mat along spaced side edges to cause central portions of the mat to deform downwardly so that litter particles within the cavities fall therefrom and into the one of the channels that extends in parallel relation to said side edges being grasped, the litter particles collected in the channel then being pourable back into a litter box or into another receptacle for disposal or storage.

In preferred embodiments of the invention, each cavity formed in a mat configured according to the invention is defined by a substantially cylindrical hollow body integrally formed with remaining portions of the mat, the hollow bodies each having an opening, the plane of which opening being flush with upper surfaces of the mat. Lower bight portions of the cavities are substantially planar, the bight portions of certain of the hollow bodies contacting a floor or the like on which the mat is placed while certain other planar bight portions of certain other, typically adjacent hollow bodies are of reduced dimension such that said other bight portions are spaced from the floor. A pet, such as a cat, walking over upper surfaces of the mat causes a portion of the surfaces contacted by paws of the pet to deform, thereby to cause the digits of the paws to spread apart and to further cause increased friction between pads of the pet's paws, this interaction between the mat and the feet of the pet causing litter particles to be dislodged more efficiently than would occur simply by the pet's walking over flat surfaces such as flat surfaces of a mat otherwise configured. Adjacent cavities in preferred embodiments are of differing sizes with smaller cavities preferably being formed by the hollow bodies dimensioned such that planar bight portions thereof do not contact a floor on which the mat is placed. The cavities can be formed other than as cylindrical cavities, cavities being polygonal, oval or otherwise configured such as being arcuately configured.

A mat configured according to the invention can also be provided with solid bodies extending downwardly toward a flooring surface rather than the hollow bodies as shown when the mat is placed on a flooring surface, the solid bodies having any desired shape such as cylindrical, polygonal and the like. In essence, the structures of such solid bodies are similar to the hollow bodies described herein but which are "filled" with the material forming the hollow bodies, this "filling" being integral with the bodies as are the bodies are integral with the mat itself in preferred embodiments.

The litter mats of the invention are preferably formed of elastomeric materials and particularly an SBR rubber such as 60 durometer, Shore A SBR, GR-5, Buna-S, styrene butadiene, the material unexpectedly facilitating particularly in preferred embodiments of the invention the removal of pet waste either in moist form or dried form from the mats. Whether the waste is moist or dry, a spray of water such as from a hose or faucet at normal household water pressures acts to rapidly remove such waste from the mats. Dried waste can usually and unexpectedly be "flaked off", that is, removed from mats such as are configured according to the invention by manual flexure such that the dried waste is literally shed from surfaces of the mats, including from cavities formed in said mats. The mats of the invention can therefore be rapidly and easily cleaned.

Accordingly, it is a primary object of the invention to provide pet litter mat structures typically placed adjacent to a litter box and on which a pet walks on egress from said litter box to dislodge litter particles adhering to paws of the pet, contact between the paws and surfaces of the mat structures also facilitating particle dislodgment through deformation of said surfaces as well as contact between the pet's paws and peripheral edges of cavities formed in said surfaces.

It is a further object of the invention to provide pet litter mat structures capable of interaction with the paws of a pet to dislodge litter particles adhering thereto on exit of the pet from a litter box, the mat structures being configured to permit collection of litter particles thus dislodged for return to the litter box or for disposal or storage in a convenient receptacle.

It is another object of the invention to provide pet mat structures formed of materials facilitating cleaning of waste from surfaces of the mat structures whether moist or dry by means of a water spray or by flexing of the mat structures to shed said dried waste.

It is yet another object of the invention to provide pet litter mat structures intended for placement in proximity to a litter box and having surfaces interactive with the motion of a pet walking over the surfaces to dislodge litter particles adhering to paws of the pet, the surfaces on which the pet is intended to walk being comfortable and familiar to the pet so that the pet will be disinclined to avoid walking on said mat structures.

It is also an object of the invention to provide mat structures for uses in environments such as for "car mats", door mats and the like wherein debris is intended to be dislodged from the feet, including the shoes, of a user.

Further objects and advantages of the invention will become more readily apparent in light of the following detailed description of the preferred embodiments.

BRIEF DESCRIPTION OF THE DRAWINGS

FIG. 10 is a lengthwise side elevational view in section of the pet litter mat of FIG. 8; and, FIG. 11 is a detail elevational view in section of a portion of the pet litter mat of FIG. 8.

DESCRIPTION OF THE PREFERRED EMBODIMENTS

Figure 1:
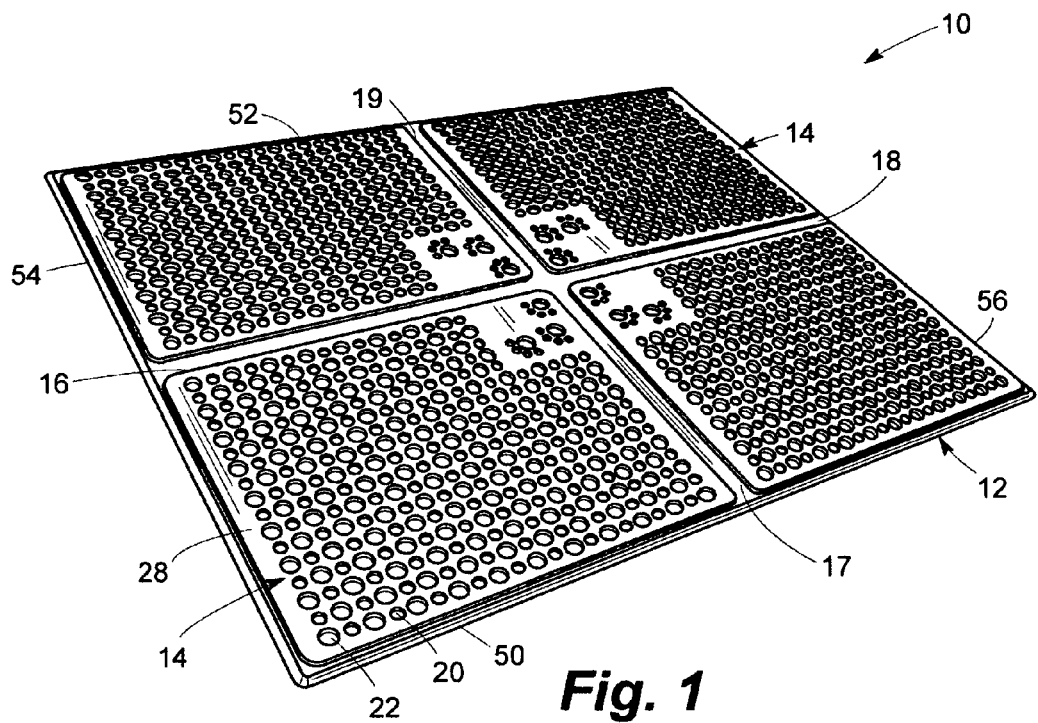
FIG. 1 is a top perspective view of a pet litter mat configured according to a preferred embodiment of the invention.
Figure 2:
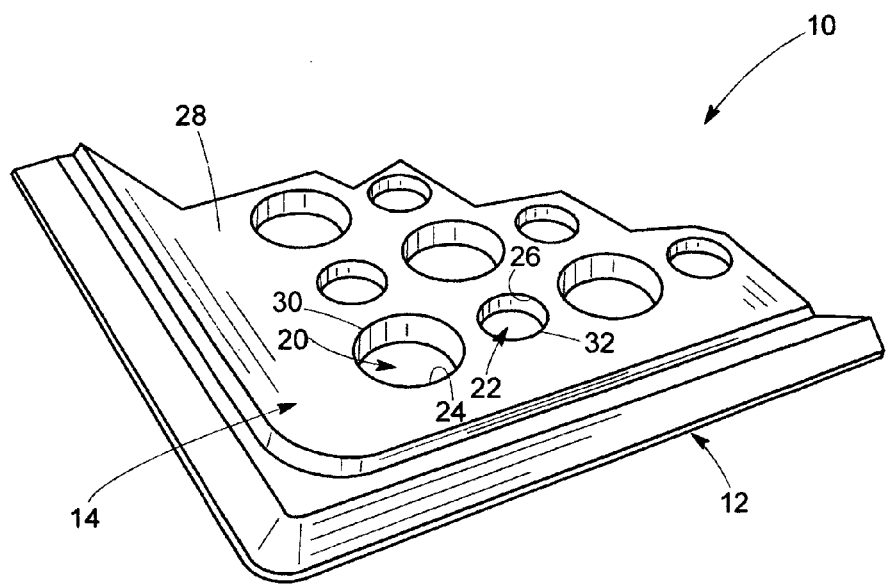
FIG. 2 is a detail perspective view of a top portion of the pet litter mat shown in FIG. 1.
Figure 3:
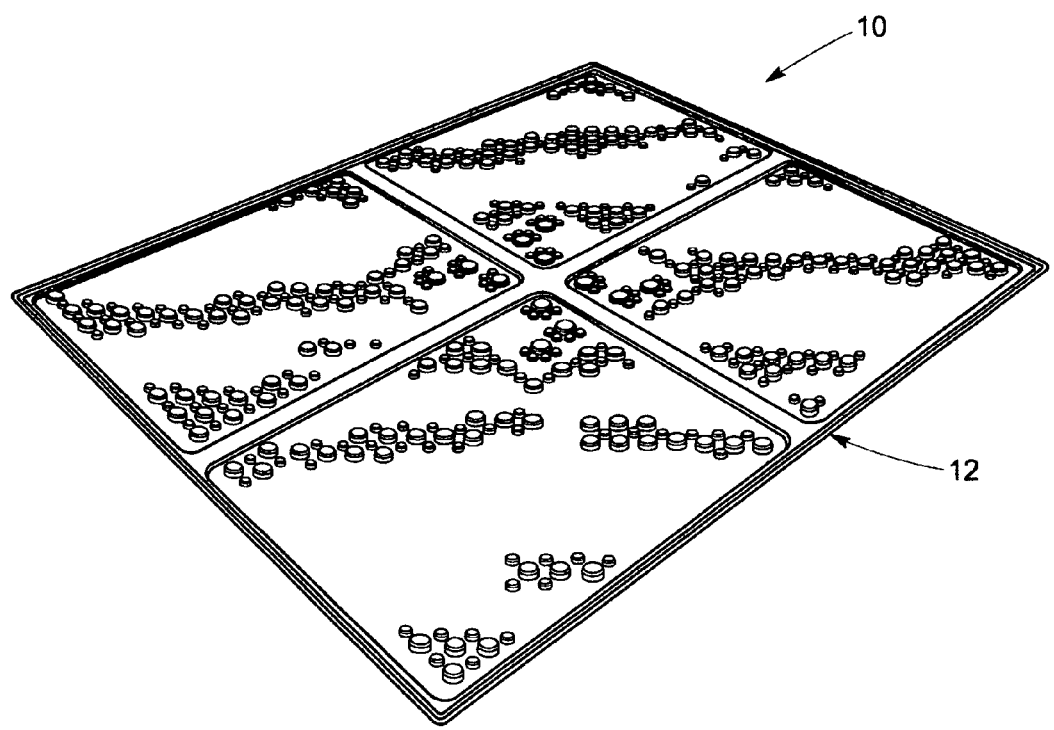
FIG. 3 is a bottom perspective view of the pet litter mat of FIG. 1.
Figure 4:
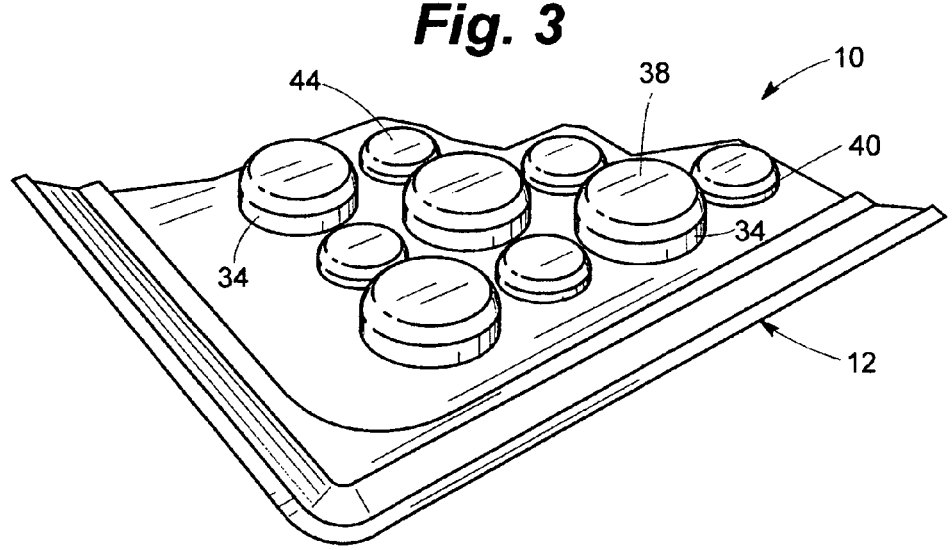
FIG. 4 is a detail perspective view of a bottom portion of the pet litter mat shown in FIG. 3.
Figure 5:
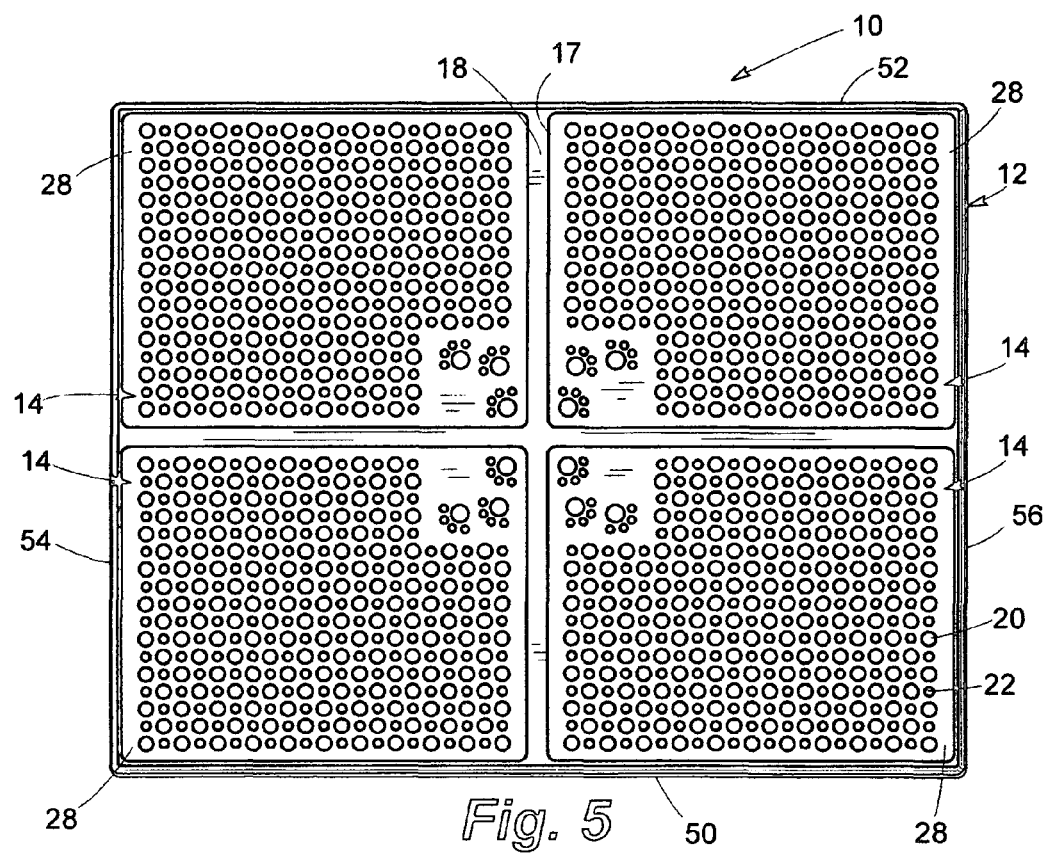
FIG. 5 is a plan view of the pet litter mat of FIG. 1.
Figure 6:
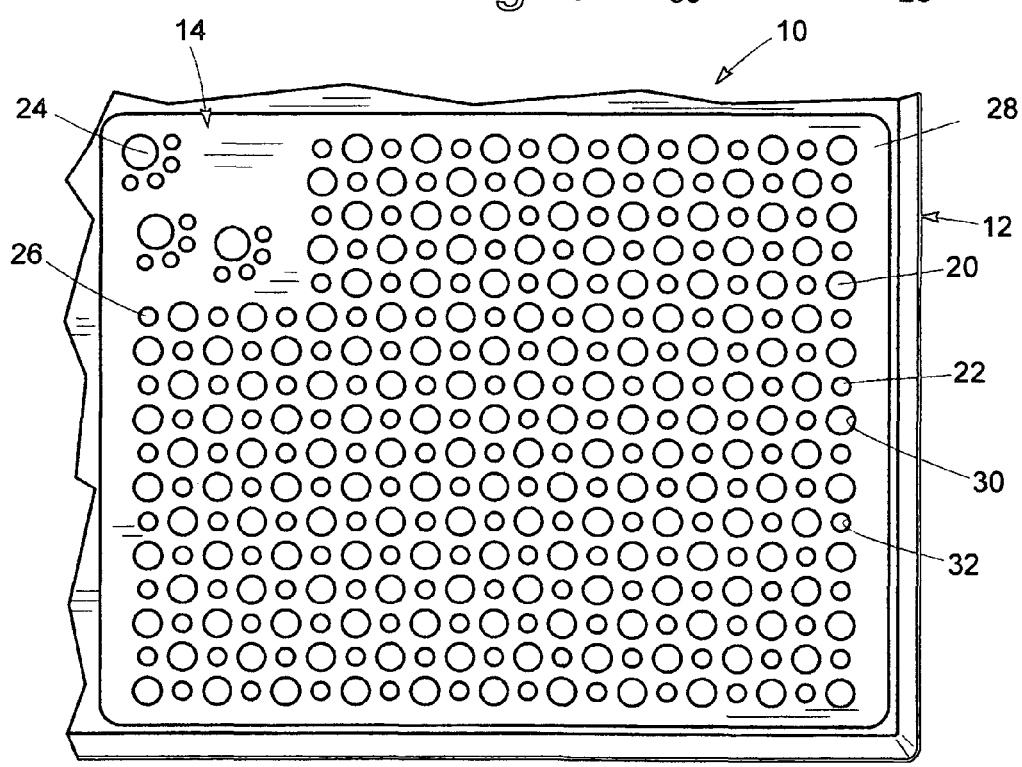
FIG. 6 is a detail view of a portion of the pet litter mat of FIG. 5.

The disclosures of U.S. Pat. Nos. Des. 383,253; 3,726,255; 5,797,352 and 6,386,143 are incorporated here into by reference.

Referring now to the drawings and particularly to FIGS. 1 and 2, 5 and 6, a pet litter mat is seen generally at 10 to preferably comprise a unitary structure molded integrally from an SBR rubber and particularly a GR-5, Buna-S styrene butadiene rubber having a durometer of 60 and characterized as Shore A SBR. This particular SBR rubber has advantages as will be further described hereinafter. The litter mat 10 is seen to be an essentially flattened structure as are mats generally, the mat 10 shown being formed into a rectangular conformation although it is to be understood that a litter mat configured according to the invention can be otherwise shaped including into circular, semi-circular and polygonal conformations inter alia.

The litter mat 10 is defined by an upwardly and inwardly tapering perimetric edge 12 extending about the full periphery of said mat 10, lower surfaces of the edge 12 lying flushly on a floor (not shown) or the like when the mat 10 is placed on a floor. In operation, the litter mat 10 is placed in an egress path adjacent to a litter box (not shown) conventionally filled with litter particles. A pet, such as a cat, using a litter box in a customary manner thus steps from such a box and onto the litter mat 10. Upper surfaces of the mat 10 are configured to exhibit a topography familiar to the experience of the pat, that is, substantially flat so that the pet does not avoid the mat 10 by jumping over it as can occur with prior art litter mats configured with apexal projections forming surfaces on which the pet is expected to walk.

Upper surfaces of the mat 10 are primarily formed as shown with four platforms 14 having rounded corners, the platforms 14 being separated by a cruciform arrangement of intersecting trough-like channels 16 and 17 having planar surfaces 18 and 19 respectively that lie below the plane of the platforms 14. The channel 16 extends lengthwise of the mat 10 while the channel 17 extends widthwise of said mat 10. The channels 16, 17 intersect centrally of the mat 10, respective terminations of the channels 16, 17 at respective perimetric edges 12 opening outwardly of the mat 10 to permit litter particles collected on the mat to easily be poured from the mat for return to a litter box or for disposal or storage of the particles as will be further described hereinafter.

The platforms 14 are essentially identical and have a regular series of cavities 20 and 22 formed therein, openings 24 and 26 respectively of the cavities 20 and 22 being flush with planar surfaces 28 forming upper surfaces of the platforms 14. As seen in the drawings, innermost corners of each of the platforms 14 are provided with patterns of the cavities 20, 22 in the shape of paws, such as cat's paws, this pattern being merely an optional expedient intended for purposes of aesthetic design. All cavities, including the cavities 20, 22 as well as the cavities forming a cat's paw design, function similarly in that perimetric edges 30 and 32 respectively of the cavities 20, 22 act to brush off litter particles adhering to the paws and particularly the pads thereof as the pet walks across the mat 10. The edges 30, 32 of the cavities 20, 22 are preferably contoured by slight rounding of said edges 30, 32 but can be otherwise be configured to have angled edges including 90 degree edges. Litter particles so dislodged are typically trapped within the cavities 20, 22 and retained therein until removal as will be described hereinafter.

Although the cavities 20, 22 are shown as dimensioned such that the respective openings 24, 26 are of differing diameter, the openings 24 of the cavities 20 being relatively larger than the relatively smaller openings 26 of the cavities 22, it is to be understood that the openings 24 or 26 could be shaped other than as circular and can be of a similar or the same diameter, circumference or perimetric dimensions. As seen in the preferred embodiment of the invention explicitly shown in the drawings, the cavities 20, 22 and thus the visible openings 24, 26 thereof are disposed substantially over the entire surfaces 28 of the platforms 14 in rows with the cavities 20, 22 alterating in a given row with adjacent rows being offset relative to each other to form an interdigitated pattern. This arrangement of the differently dimensioned cavities 20, 22 and thus the visible openings 24, 26 thereof provides a pleasing appearance and further provides efficient function in dislodgment of litter particles and the like from the paws or feet of a pet as the pet walks over upper surfaces of the mat 10.

As can be best appreciated with reference to FIGS. 3, 4, 7 and 11 with continuing reference to FIGS. 1, 2 5 and 6, structure formed in the mat 10 synergistically functions in concert with the cavities 20,22 to increase dislodgement of litter particles from the paws of a pet walking on surfaces of the mat 10. In particular, each cavity 20 is defined by an essentially closed-end cylindrical body 34 formed integrally with the respective platform 14 with which said body 34 is formed.

A wall 36 of each cylindrical body 34 defining each one of the cavities 20 terminates distally in a planar bottom member 38, outer surfaces of the bottom member 38 flushly fitting against a floor or other surface on which the litter mat 10 is placed. Accordingly, the bottom member 38 of the cavities 20 act along with lower surfaces of the edge 12 to contact a floor or the like and thus to provide support to the mat 10.

In a similar fashion, each cavity 22 is defined by an essentially closed-end cylindrical body 40 formed integrally with the respective platform 14 with which said body 40 is formed. A wall 42 of each cylindrical body 40 defining each one of the cavities 22 terminates distally in a planar bottom member 44, the depth of each of the cavities 22, that is, the height of the cylindrical body 40, being less than the depth of the cylindrical bodies 34 defining the cavities 20. The bottom members 44 of the cavities 22 therefore do not contact a floor or other surface on which the mat 10 is placed when the mat 10 is not compressed by a force acting on upper surfaces of the mat 10 as is clearly seen in FIG. 11. However, pressure applied to upper surfaces of the mat 10 caused by a pet's walking on the mat causes flexure of upper surfaces of the mat and thus a spreading apart of the digits of the paws or feet of the pet, thereby to facilitate dislodgment of the particles held between said digits. The interaction between the paws of the pet and the structure of the mat 10 therefore acts to dislodge litter particles from between the digits of the paws of a pet as well as from pads of the pet's paws. The mat 10 is therefore interactive with the paws or feet of a pet as the pet walks across and exerts compressive forces on upper surfaces of the mat 10 at those loci of contact between surfaces of the mat and the paws of the pet.

Litter particles thus dislodged from the paws of a pet typically enter one of the cavities 20, 22 and are held therein such that such particles will not subsequently readhere to the pet's paws, the litter particles thus being trapped in the cavities 20, 22. Litter particles retained in the cavities 20, 22 can readily and conveniently be removed from the cavities by manually grasping either opposing lengthwise sides 50 and 52 or widthwise sides 54 and 56 of the mat 10 and then lifting the mat to cause central portions of the mat to deform downwardly, litter particles thus falling downwardly from the cavities 20, 22 and into one of the channels 16. Lengthwise sides 50,52 or widthwise sides 54,56 can then be quickly folded or snapped together so that litter particles present in the cavities 20,22 are caused to be displaced from the cavities 20,22 and into one of the channels 16 or 17 depending on whether the sides 50,52 or 54,56 are grasped. The litter particles then present in either one of the channels 16 or 17 can be moved along said channel 16 or 17 by tilting of the mat 10 to pour said particles back into a litter box or into a receptacle for disposal or subsequent reuse.

The invention also envisions formation of the cylindrical bodies 34 and/or 40 as solid bodies, mats so configured exhibiting the flexure described above relative to the hollow bodies 34,40 for particle dislodgement. In mat configurations of this nature, surface openings and cavities communicating with the openings are not available for the functions described herein.

Cleaning of the mat 10 is facilitated by the SBR material from which the mat 10 is preferably formed as alluded to hereinabove. Any moist pet waste adhering to the mat 10 can be readily removed by a water spray at normal household water pressures. Dried waste can similarly be easily removed by a water spray at normal household water pressures or can be removed by manual grasping of the mat 10 and flexing of the mat to deform the mat particularly in the vicinity of the location of the dried waste, such waste essentially flaking, peeling or shedding from mat surfaces including those surfaces within the cavities 20, 22. The mat 10 is thus unexpectedly characterized by an unusual ability to remove from the mat pet wastes including litter particles stuck to the mat.

Figure 7:
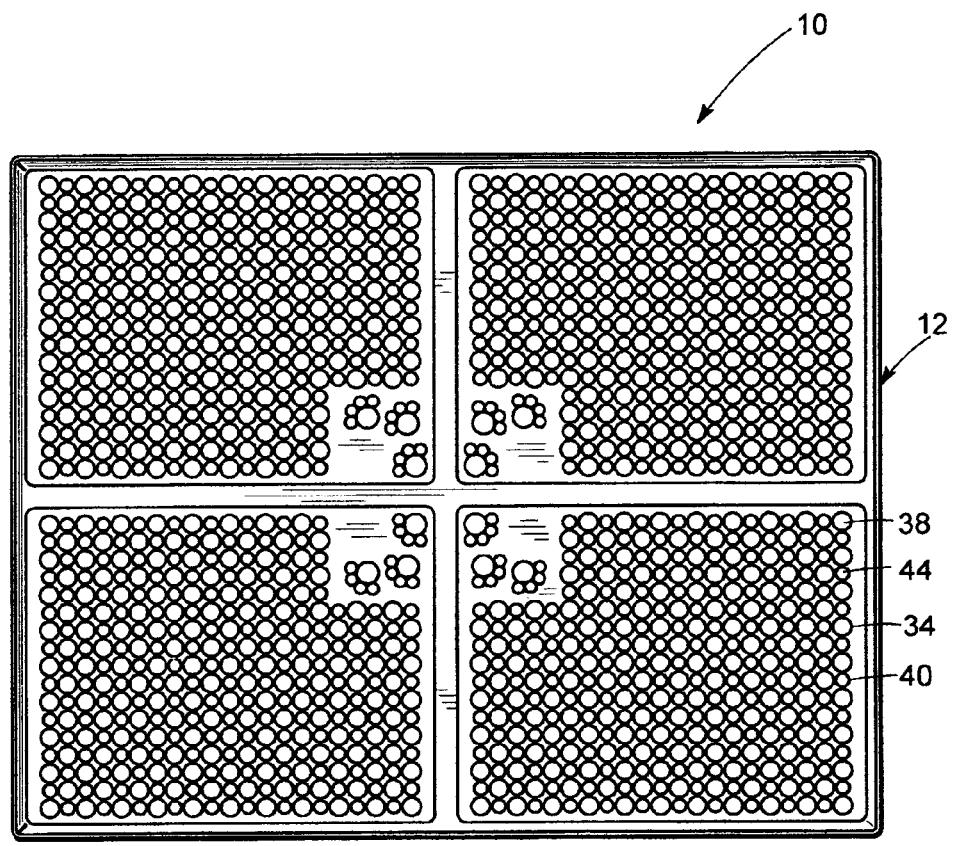
FIG. 7 is a bottom view of the pet litter mat of FIG. 1.
Figure 8:
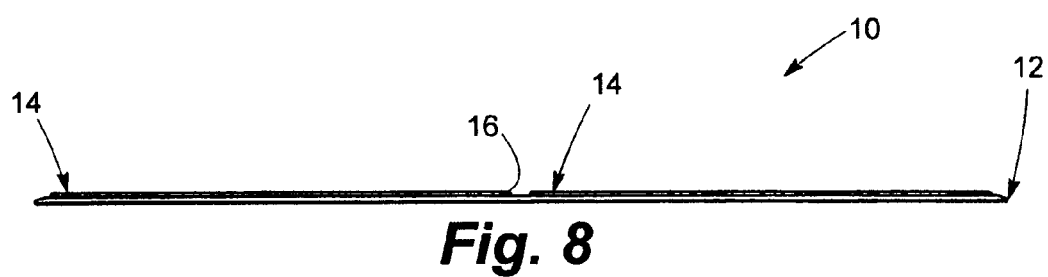
FIG. 8 is a lengthwise side elevational view of the pet litter mat of FIG. 1.
Figure 9:
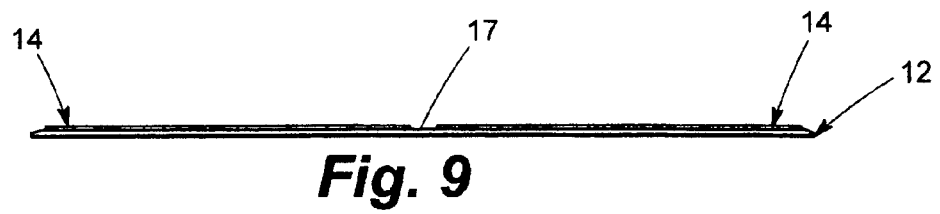
FIG. 9 is a widthwise side elevational view of the pet litter mat of FIG. 1.

The relative height to length and width relationships of preferred embodiments of the mat 10 can be seen in FIGS. 7, 8 and 9 respectively, a typical height of the mat 10 being on the order of one-quarter inch. However, it is to be understood that the dimensional relationships as well as shape of mats configured according to the invention can be chosen to be other than as explicitly shown herein.

While the inventive concept underlying the preferred embodiments of the invention has been explicitly disclosed relative to use as particular litter mats as described, it is to be understood that litter mats configured according to the invention can be structured other than as explicitly described herein. As only one example, a mat configured according to the invention could be formed without the channels 16,17 and/or without the decorative cavities 20,22 located at innermost corners of each of the platforms 14. In such mat structures, edge details such as seen at 12 and particularly in FIG. 11 could exist about the full periphery of such a mat structure. Rows of the alternating cavities 20,22 could extend throughout the upper surfaces of such mat structures. Patterns of cavities can also be configured other than as explicitly shown and described herein. Further, the mat structures explicitly described as otherwise being within the scope of the invention can be used in other environments and in ways other than have been alluded to herein, the scope of the invention being defined by the definitions provided by the appended claims.

What is claimed is:

1. A mat intended to be placed on a flooring surface or the like, comprising:

a body member having surfaces on which a user walks or otherwise contacts surfaces of the mat; and, means associated with the surfaces of the body member for dislodging particles of debris from the feet of the user on contact of said feet with the surfaces of the mat and interactive on contact between said surfaces and the feet or other portion of the user contacting said surfaces to deform at least portions of said surfaces while maintaining said surfaces in a topographical condition suitable to and familiar to the user, said means comprising a multiplicity of cavities defined in the body member, the cavities having openings formed in at least portions of the surfaces of the body member, particles of debris adhering to the feet of a user contacting the surfaces of the mat being dislodged on contact with peripheral edges of the openings defined in said surfaces of the body member, the dislodged particles falling into said cavities and being at least temporarily retained therein, the cavities being defined by shaped hollow projections extending from at least certain portions of the surfaces of the body member toward a flooring surface or the like on which the mat is disposed, the projections terminating distally in surface portions of the body member enclosing said cavities, at least certain of the enclosing surface portions of the projections contacting the flooring surface and at least certain other of the enclosing surface portions of certain other projections being spaced from the flooring surface, pressure exerted on surfaces of the body member contacted by the user causing flexure of the surfaces of the body member to facilitate release of said particles adhering to the user for dislodgement of said particles from the user.

2. The mat of claim 1 wherein the mat is placed in proximity to a receptacle containing a litter material used by a pet for waste elimination, the pet walking on the surface of the mat on exit from the receptacle, the means dislodging particles of the litter material from the paws or feet of the pet as the pet walks on or contacts said surfaces of the mat, flexure of surfaces of the body member spreading apart digits of the paws of the pet to facilitate release of the particles of the litter material lodged therebetween for dislodgement of said particles from the paws of the pet.

3. The mat of claim 1 wherein certain of the cavities have relatively larger openings than certain other of the cavities.

4. The mat of claim 1 wherein the cavities are disposed in a plurality of aligned series wherein cavities having relatively larger openings alternate with cavities having relatively smaller openings, adjacent series being offset relative to each other to form an interdigitated pattern of relatively larger and relatively smaller openings formed in at least portions of the surfaces of the mat.

5. The mat of claim 1 and further comprising channel means formed in the surfaces of the body member for receiving particles of the litter material dislodged from paws of a pet and for providing at least one pathway along which said particles can be moved to pour the particles back into the receptacle or into another receptacle for disposal or storage.

6. The mat of claim 1 wherein the mat is an integrally formed article and is formed of a material selected from the group of styrene butadiene rubbers.

7. The mat of claim 6 wherein the rubber comprises a 60 durometer, Shore A styrene butadiene rubber characterized as GR-5, Buna-S.

8. A mat intended to be placed on a flooring surface or the like, comprising:

a body member having surfaces on which a user walks or otherwise contacts the surfaces of the body member;

means associated with the surfaces of the body member for dislodging particles of debris from the feet of the user on contact with the surfaces of the mat and interactive on contact between the surfaces and the feet or other portion of the user contacting said surfaces to deform at least portions of said surfaces while maintaining said surface in a topographical condition suitable to and familiar to the user, said means comprising a multiplicity of cavities defined in the body member, the cavities having openings formed in at least portions of the surfaces of the body member, particles of the debris adhering to the feet of a user contacting the surfaces of the mat being dislodged on contact with peripheral edges of the openings defined in said surfaces of the body member, the dislodged particles falling into said cavities and being at least temporarily retained therein; and, channel means formed in the surfaces of the body member on at least portions of said surfaces devoid of the openings of the cavities and adjacent at least certain of the openings formed in the surfaces for receiving particles of the dislodged debris both directly from the user and from the cavities within which the particles are retained on manipulation of the mat and for providing at least one pathway along which said particles can be moved to pour said particles into a receptacle, the channel means comprising a cruciform arrangement of elongated trough-like depressions formed in surfaces of the body member and intersecting centrally of the mat, the depressions extending toward and to at least one edge of the mat to facilitate pouring of the particles.

9. A mat intended to be placed on a flooring surface or the like, comprising:

a body member having surfaces on which a pet walks or otherwise contacts the surfaces of the body member, the mat being placeable in proximity to a receptacle containing a litter material used by the pet for waste elimination, the pet walking on the surfaces of the mat on exit from the receptacle;

means associated with the surfaces of the body member for dislodging particles of the litter material from the feet or paws of the pet on contact with the surfaces of the mat and interactive on contact between said surfaces and the pet contacting said surfaces to deform at least portions of said surfaces while maintaining said surfaces in a topographical condition suitable to and familiar to the pet, the means dislodging particles of the litter material from the paws or feet of the pet as the pet walks on or contacts said surfaces of the mat; and, channel means formed in the surfaces of the body member for receiving particles of the litter material dislodged from paws or feet of the pet and for providing at least one pathway along which said particles can be moved to pour the particles back into the receptacle or into another receptacle for disposal or storage, the channel means comprising a cruciform arrangement of elongated trough-like depressions formed in the surface of the body member and intersecting centrally of the mat, the depressions extending toward and to at least one edge of the mat to facilitate pouring of the particles.

10. The mat of claim 9 wherein the mat is an integrally formed article and is formed of a material selected from the group of styrene butadiene rubbers.

11. The mat of claim 10 wherein the rubber is a 60 durometer, Shore A styrene butadiene rubber characterized as OR-5, Buna-S.

12. A mat intended to be placed on a flooring surface or the like in proximity to a receptacle containing a litter material used by a pet for waste elimination, the pet walking on surfaces of the mat on exit from the receptacle, comprising:

a body member having surfaces on which the pet walks or otherwise contacts the surfaces of the body member;

means associated with the surfaces of the body member for dislodging particles of the litter material from the paws or feet of the pet as the pet walks on or contacts said surfaces of the body member and interactive on contact between the surfaces of the body member and the paws or feet or other portion of the pet contacting the surfaces of the body member to deform at least portions of said surfaces while maintaining said surfaces in a topographical condition suitable and familiar to the pet; and, a multiplicity of cavities defined in the body member, the cavities having openings formed in at least portions of the surfaces of the body member, particles of litter adhering to the paws or feet of the pet walking on the mat being dislodged on contact with peripheral edges of the openings defined in said surfaces of the body member, the dislodged particles of the litter material falling into said cavities and being retained therein, the cavities being defined by shaped hollow projections extending from at least certain portions of the surfaces of the body member toward a flooring surface or the like on which the mat is placed, the projections terminating distally in surface portions enclosing said cavities, at least certain of the enclosing surface portions of the projections contacting the flooring surface and at least certain other of the enclosing surface portions of certain other projections being spaced from the flooring surface, pressure exerted on the surfaces of the body member on which the pet walks causing flexure of the surfaces of the body member to spread apart digits of the paws of the pet to facilitate release of particles of the litter material lodged therebetween for dislodgement of particles from the paws of the pet.

13. The mat of claim 12 wherein certain of the cavities have relatively larger openings than certain other of the cavities.

14. The mat of claim 13 wherein the cavities are disposed in a plurality of aligned series wherein cavities having relatively larger openings alternate with cavities having relatively smaller openings, adjacent series being offset relative to each other to form an interdigitated pattern of relatively larger and relatively smaller openings formed in at least portions of the surfaces of the mat.

* * * * *